United States Patent [19]

Yamashita

[11] 4,131,972
[45] Jan. 2, 1979

[54] VERTICAL MEAT CHOPPER

[76] Inventor: Seiji Yamashita, 14-3, Nakamura-cho 1-chome, Minami-ku, Yokohama 232, Japan

[21] Appl. No.: 847,612

[22] Filed: Nov. 1, 1977

[30] Foreign Application Priority Data

Nov. 1, 1976 [JP] Japan .................. 51-131380

[51] Int. Cl.² .............................................. A22B 5/20
[52] U.S. Cl. .......................................... 17/23; 17/45
[58] Field of Search ..................................... 17/23, 45

[56] References Cited

U.S. PATENT DOCUMENTS

| | | | |
|---|---|---|---|
| 3,488,797 | 1/1970 | Dirks | 17/23 |
| 3,533,131 | 10/1970 | Ivarsson | 17/23 |
| 3,829,932 | 8/1974 | Griss | 17/23 |
| 3,916,482 | 11/1975 | Kvilhaug | 17/23 |

*Primary Examiner*—Donald R. Schran

[57] ABSTRACT

There is a mechanism allowing a speedy and smooth inductive operation in XYZ directions with a guide post erected on a floor.

A chopper casing is provided on the fore end of a thrust shaft being supported by said mechanism and being freely movable forewards and backwards. Wedge projections are provided on both sides of the casing. A pair of stanchions both project downward from each side of the chopper for positioning, space retaining and guiding for swing-down operation of a chopper.

One end of the chopper is pivoted to the casing, other end thereof is left free and along the lower edge thereof provides a blade which reciprocates in vertical direction by an automatic driving means.

A mechanism controlling accidental drop of the chopper is provided by attaching a rack and pinion, a ratchet and ratchet wheel.

5 Claims, 6 Drawing Figures

VERTICAL MEAT CHOPPER

BACKGROUND OF THE INVENTION

This invention relates to a meat chopper which cuts edible live-stock such as cattle, porker, sheep, etc. into halves along its backbone. In particular, it belongs in a type of the choppers which provide automatic repetitive operation for longitudinal chopping of meat and bones.

As means of vertically chopping edible live-stock along its backbone by inversely suspending the carcass, a chopping method and sawing method have been well known. In the former case, however, the bone chips tend to become embedded in the meat, rendering it unpleasant for eating, and in the case of reciprocating sawing method the carcase to be cut tends to move or swing thus causing reduced cutting efficiency. Furthermore, the use of the chain-saw, which is still the most popular system today, must be avoided because it has been revealed that Raynaud's disease can occur in chain saw operators. On the other hand, the conventional hand chopper method is poor in its working efficiency, being unsuitable for mass production although it is free from the various disadvantages described in the above-mentioned sawing method. From the massproduction point of view, the chain saw system, with its processing capacity of 20–30 head per hour, has been the best.

The primary purpose of this invention is to create and provide a vertical meat chopper having a high speed mass processing capacity of 200–300 head per hour, i.e. about ten times as much as that of conventional type chopper, achieved as a result of the newly introduced system wherein the inductive operating mechanism permits speedy, accurate, smooth and easy positioning for cutting, whilst correction of cutting direction is provided in addition to the automatic chopping system, completely overcoming the deficiencies of the sawing system.

The secondary purpose of this invention is to create and provide a vertical meat chopper bringing about an improvement in safety and working efficiency, by providing a control mechanism for the lowering operation, with the object of preventing danger in the event of a quick and extensive lowering of the automatic chopping system, when the reaction to the chopping force is suddenly lost during the cutting operation or during meat delivery or shut-down period of the chopper, etc.

SUMMARY OF THE INVENTION

A vertical meat chopper consisting of:
(a) a mechanism allowing a speedy and smooth inductive operation in XYZ directions with a guide post vertically erected on the floor as its datum axis;
(b) a chopper casing provided on the fore end of the thrust shaft which is supported by said mechanism and is freely movable forewards and backwards;
(c) wedge projections provided on both sides of said casing;
(d) a means whereby one end of the chopper is pivoted by said casing and the other end is left free;
(e) a blade provided along the lower edge of said chopper;
(f) a pair of stanchions both projected downward from each side of said casing, which provide the means of positioning, space retaining and guiding for swing-down operation of said chopper; and
(g) an automatic driving means to reciprocate said chopper in vertical direction.

In addition, a mechanism controlling accidental drop of the chopper is provided by attaching a rack and pinion mechanism, ratchet mechanism and an engaging and disengaging means for the ratchet, to said mechanisms.

BRIEF DESCRIPTION OF THE DRAWINGS

The drawings show an embodiment of this invention.

DESCRIPTION OF THE PREFERRED EMBODIMENT

The invention will be more fully understood from the following description of preffered embodiments taken in conjunction with the attached drawings.

An inductive operating mechanism in three directions, axes X, Y and Z shall be first explained.

Figure 2:
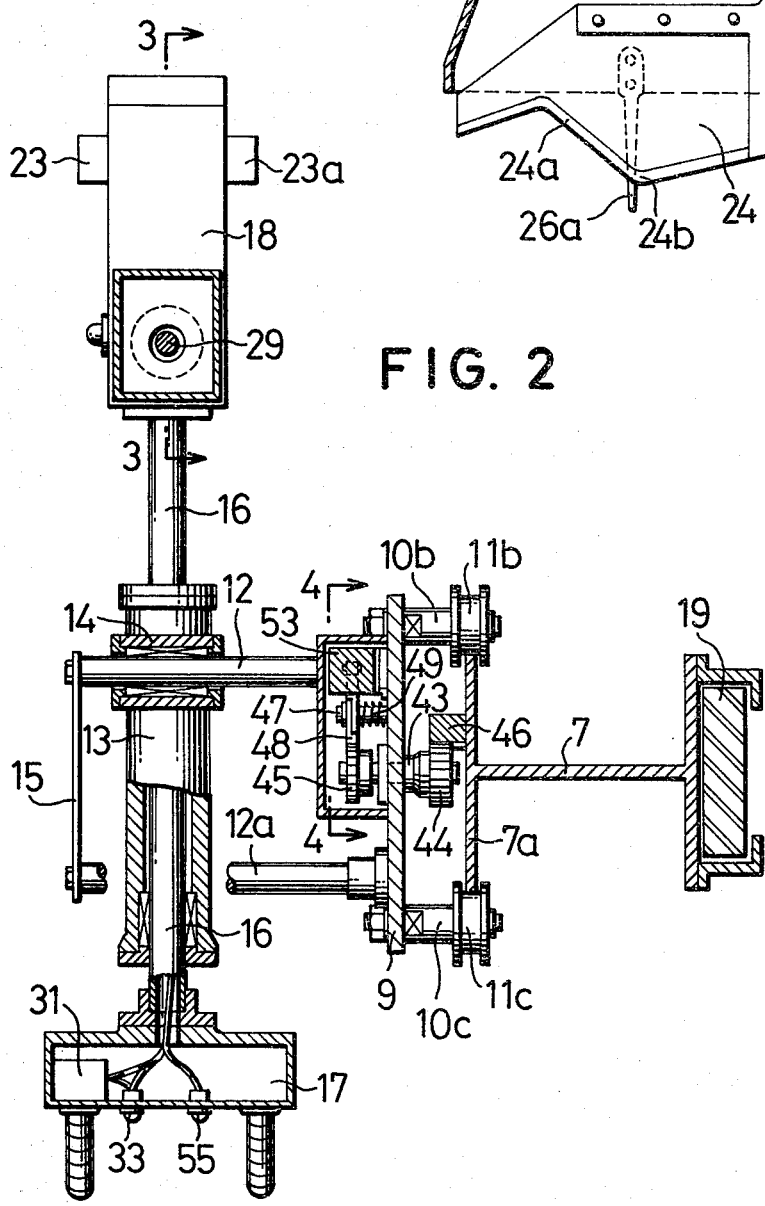
FIG. 2 is a horizontal sectional plan view taken along line 2—2 in FIG. 1.

A guide post 7 made of such as H-shape steel is fixed perpendicularly on a floor 8 with the required height. On the other hand, pins 10, 10a, 10b and 10c are respectively projected on the same side plane from four corners of a base plate 9 and furthermore, each of said pins is fitted with four pieces of grooved guide rollers 11, 11a, 11b and 11c, two pieces each on its top and bottom in such a way as to allow free rotation. Said base plate 9 is installed in the vertical direction in such a way that it is able to move freely and that both ends of a vertical plate 7a on one side of said guide post 7 made of H-shape steel is held from outside by each groove of said four rollers. From the other side of said base plate 9, guide shafts 12 and 12a are projected in parallel with each other with the required space in the horizontal direction and with equal height and length. A bearing 13, having sufficient length for installation, is provided between said pair of guide shafts. From both ends of said bearing, a pair of brackets 14 and 14a are projected upward and are loose-fitted on said guide shafts 12 and 12a respectively so that each bracket is able to slide to the left and right along each guide shaft. Numeral 15 is a stopper fixed between the fore ends of said guide shafts. Being securely suspended from guide shafts 12 and 12a in left and right direction by a pair of brackets 14 and 14a, said long bearing 13 extends in the back and forth direction, thus supporting long thrust shaft 16 and allowing free sliding and movement thereof in the back and forth direction. It is desirable to design said thrust shaft 16 so that it is capable of some angular movement in circumferential direction, so that it is able to follow the direction of a carcass suspended out of line, and to cut the carcase in a slightly oblique and downward direction. On one end of the thrust shaft 16, a control box 17 with "two hand action handle" is fixed and, on the other end, a chopper casing 18 is fixed. Said base plate 9 and a weight 19 suspended on the other side of said guide post 7 (see FIG. 2) are connected through a pair of sheaves 21 and 21a installed on the top of guide post 7 with a wire 20, whereby the total weight loaded on said base plate is counter-balanced by said weight. Numeral 22 is a connecting pin for the end of said wire projected from the base plate 9.

Figure 1:
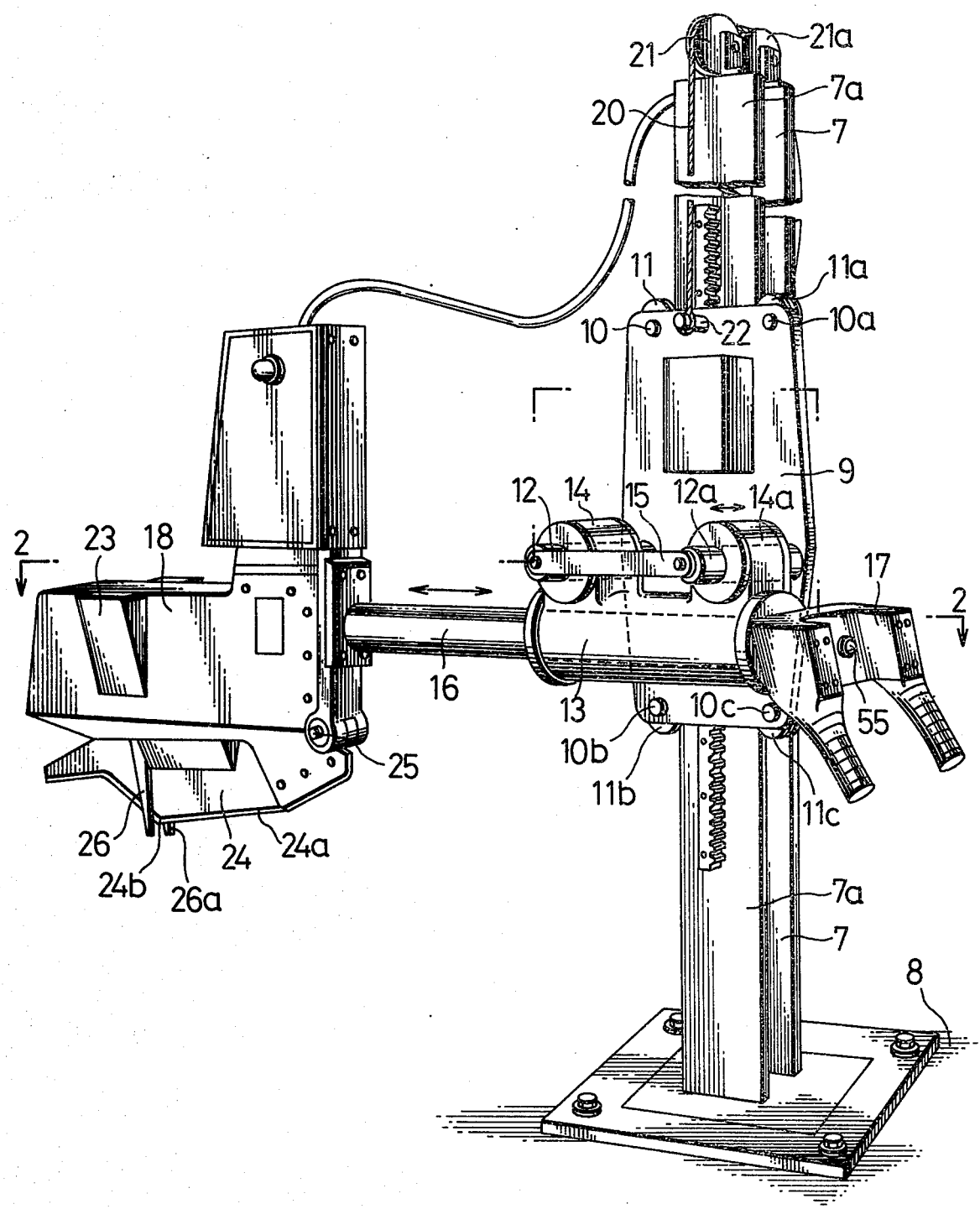
FIG. 1 is a perspective view mainly showing left side.
Figure 3:
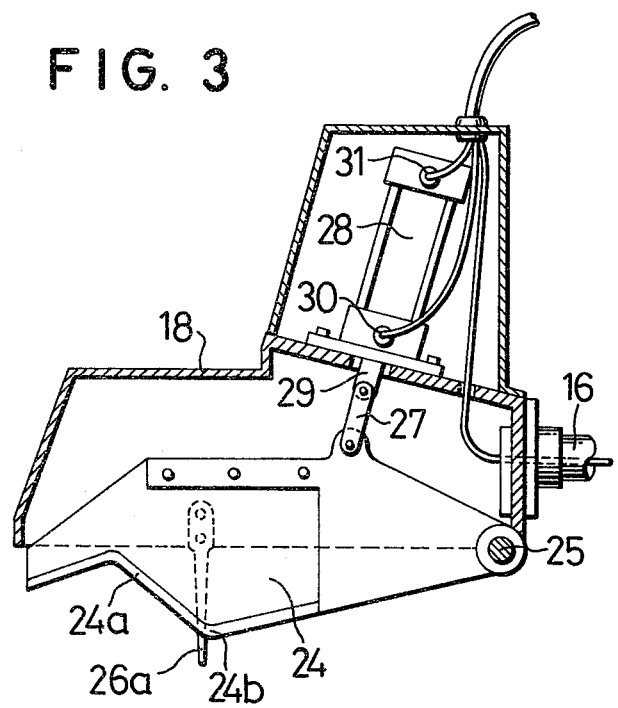
FIG. 3 is a vertical sectional left side view taken along line 3—3 in FIG. 2.
Figure 6:
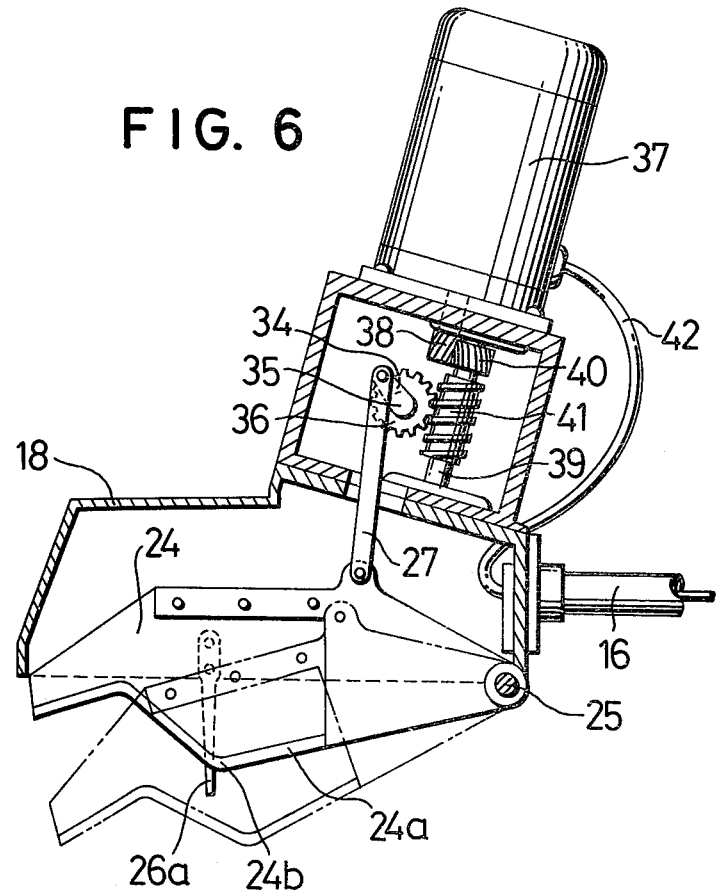
FIG. 6 is a vertical sectional left side view same as FIG. 3, showing another embodiment of the chopper driving mechanism.

Secondly, an automatic chopping mechanism shall be explained as follows:

As aforementioned, the chopper casing 18 is fixed to the other end of the thrust shaft 16, and wedge projections 23 and 23a are respectively provided on both sides of said casing 18 to push open chopped meat in left and right direction. Since a chopper 24 is projected downward from the lower edge of the casing 18, one end of it being pivoted to the casing 18 with a supporting shaft 25, said chopper can be installed in such a way that its free end can make an angular swing around supporting shaft 25 in vertical direction. A blade 24a is provided at the lower end of the chopper 24. It is more desirable to make said lower end of the chopper 24 obtuse by bending it obliquely upward in direction from a swing-down center 24b to its fore end as shown in FIGS. 3 and 6, than to make it straight, because cutting operation can proceed, with the recommended obtuse shape, under such conditions where the center of the object to be chopped is cut open deeper than the surrounding part, consequently preventing the object from being moved by repetitive swing-down pressure of the chopper 24. Thus, the object can be held steady, allowing an easy and fast chopping operation. On the other hand, the pair of stanchions 26 and 26a are respectively suspended from both sides of the casing 18 and fixed, whereby positioning for the swing-down operation of the chopper 24, maintenance of swing-down space and guiding of blade are controlled. Reciprocating movement in vertical swing-down operation of the chopper 24 is obtained by a means in which the lower end of a piston rod 29 for an air cylinder 28 is pivoted by the upper end of a link 27 pivoted to the middle part of the chopper and an air press-in change-over valve (not shown in drawings) for ports 30 and 31 provided on the top and bottom ends of said air cylinder 28 is repeatedly operated, for instance, with a twin timer 32 installed in the control box 17. Shifting control of the change-over valve may also be carried out by ON/OFF operation of a solenoid (not shown in drawings). Numeral 33 is a push-button switch for change-over operation provided in the control box 17.

The following is another example of the chopper driving system, explained with reference to FIG. 6:

The upper end of the link 27 is pivoted to the fore end of a crank arm 34, and a worm wheel 36 is provided on a crank shaft 35. On the other hand, a driving gear 38 on the driving shaft of a motor 37 is engaged with a driven gear 40 on worm shaft 39. After sufficiently reducing the revolutions of said motor 37 with worm mechanism by engaging a worm 41 fixed on said worm shaft 39 with said worm wheel 36, said rotating motion is changed to reciprocating movement by a crank mechanism to give vertical reciprocal motion to the chopper 24. Numeral 42 is an electric power supply cable for driving the motor. It is desirable to run said cable to the control box 17 through the hollow portion in said thrust shaft 16 to facilitate the control operation.

The system claimed in this invention allows sufficiently speedly and reliable processing of meat chopping by employing the related operation of said automatic chopping mechanism and said inductive mechanism. It is, however, desirable that the operation should always be safe and free of accident risk, and this should always be borne out in actual operation. This can be realized by constructing said automatic chopping mechanism in such a way that the movement of said mechanism allows free upward movement along the guide post 7, while the lowering movement is controlled by quick brake action whenever required, in its downward movement.

Figure 4:
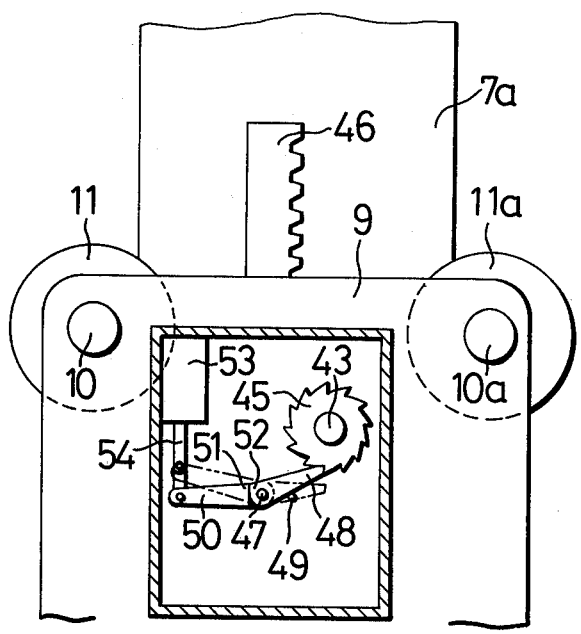
FIG. 4 is a vertical sectional left side view taken along line 4—4 in FIG. 2.

Detailed below is an example of such construction:

A rotatable shaft 43 is installed through said base plate 9 with its one end fixed to a pinion 44 and other end fixed to a ratchet wheel 45. A rack 46 is fixed along said guide post 7 in vertical direction and engaged with said pinion 44 and on the other hand, a pin 47 is projected from said base plate and a ratchet 48 is fitted, being supported by said pin. Said ratchet 48 and said ratchet wheel 45 are then engaged with each other so that said base plate 9 is disengaged in the lifting movement and locked in the lowering movement as shown in FIG. 4. The ratchet 48 is always under pressure towards the engaging direction by a coiled spring 49 wound around the pin 47 and, at the same time, its construction is such as to artificially engage ordisengage the ratchet only in the case where a jaw 51 of a control lever 50, the fore end of which is pivoted by said pin 47, actuates in such a direction as to push a jaw 52 provided on the base end of said ratchet 48. Therefore, a solenoid 53 is provided and the other end of said control lever 50 is pivoted by the fore end of a displacement rod 54 operated by said solenoid. A wiring circuit is laid out in such a way that ON/OFF control of said solenoid 53 can be remote-controlled by a push-button switch 55 installed in said control box 17.

Figure 5:
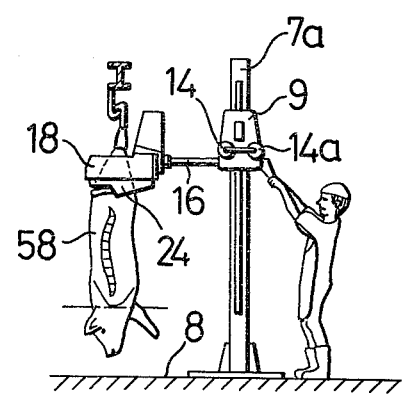
FIG. 5 is a perspective view showing an example of the chopper claimed in this invention.

Function of the system claimed in this invention is as follows:

The control lever 50 connected to the rod 54 comes to the position shown by full-line in FIG. 4 since solenoid 53 is disenergized when the push-button switch 55 is kept open. The ratchet 48 is constantly in engagement with the ratchet wheel 45, being actuated by the coiled spring 49. Because of said ratchet engagement, the pinion 44 located on the same axis as said ratchet wheel 45 is freely rotatable against the rack 46 in the lifting direction but lowering is prevented. Therefore, it is possible to bring the main unit of the system to the unused position by pushing up the same to the top of the guide post 7, or the main unit can be pushed up to the top of the guide post 7, as in the above case, when the process is transferred from the preceding chopping process to the delivery of the meat to be subsequently processed. In case of the latter, a chopped object 58 is delivered into working position by a hanger which is transported by a conveyor as shown in FIG. 5. It is, therefore, necessary to move the chopper casing 18 fixed on the fore end of the thrust shaft 16 toward bearing 13 by fully pulling the control handle toward the operator in order to prevent the chopper casing from blocking the delivery route.

After the object 58 is correctly positioned and held steady, casing 18 shall be inserted between the hind legs of inversely suspended the object 58 by pushing the control handle foreward. Then, the solenoid 53 shall be energized by turning OFF the push-button switch 55, the rod 54 shall be drawn in and the ratchet 48 shall be disengaged from the ratchet wheel 45 by pressing the jaw 52 of the ratchet 48 with the jaw 51 of the control lever 50. As a result of the above operation, the restriction on one way rotation of the pinion 44 is removed, allowing the descent of the chopper casing 18. Thus, a pair of the stanchions 26 and 26a projected downward from said casing come in contact with the root of the hind legs to stop the lowering.

Then, said stanchions 26 and 26a shall be adjusted and placed on the coccyx of the object by again operating the control handle.

When other push-button switch 33 is turned OFF after completion of the abovementioned adjustment, the twin timer 31 actuates to alternately force in air to the ports 30 and 31 of the air cylinder 28, allowing the piston rod 29 to perform its reciprocating movement in the vertical direction, the movement being transmitted to the chopper 24 through the link 27.

Since a part 24b of the blade 24 at the position of said stanchions 26 and 26a is projected extremely downward as the center of swing-down operation, the chopper 24 is correctly swung down onto the coccyx positioned with correct, continuous and repetitive movement. Consequently, the coccyx is definitely broken by the chopper and the meat around the coccyx is cut open by the other parts of the chopper blade.

The object to be chopped does not receive any impact force deviating in a forward or backward direction when the chopper 24 is swung down, because the blade of the chopper 24 has an obtuse angle shape longitudinally rising with the same inclination from the swing-down center 24b. Therefore, chopping operation can always be carried out with the object held stationary, so that it does not slide forward or backward.

When the chopping direction is seen to be deviating to the left or right due to some failure, the push-button switch 55 shall immediately pressed to de-energize the solenoid 53 so that the ratchet wheel 45 is engaged with the ratchet 48, thus stopping the lowering of the chopper 24 and holding the same at the height it had reached. Then, the chopping direction shall be corrected by operating control handle to obtain normal alignment.

The reaction force caused by the impact produced when the chopper 24 is swung down onto the object 58, is transmitted to the base plate 9 at a moment centered on the guide shafts 12 and 12a. The base plate 9 is fitted to the guide plate 7, being supported by the guide rollers 10, 10a, 10b and 10c which are spaced vertically. Therefore, said the reaction force does not hinder the lowering operation because it does not act to lift or raise said base plate 9.

It is also possible to correct chopping direction or prevent troubles in lowering operation by handle operation alone without the ratchet mechanism, if operator is skilled. In such a case, a device to lock the base plate 9 at the extreme-top end of the guide post 7 (not shown in drawings) would be sufficient.

The automatic chopping mechanism with chopper system which is free from the defects inherent in the sawing system, and the inductive operating mechanism which freely operates thereof, being coupled together, the system claimed in this invention allows a speedy, reliable, smooth and easy meat chopping operation in addition to a close operating capability: For example, it allows processing of a remarkably large quantity of meat, e.g. about ten times as much as that processable by conventional systems. Furthermore, the lowering control device of automatic chopping mechanism employed in the system which guarantees working safety, increases the working efficiency to a much greater extent, affording the meat processing business an immense advantage.

What is claimed is:

1. Vertical meat chopper provided with the following mechanisms;

an inductive operating mechanism in X Y Z directions, comprising a base plate which slides in a vertical direction along one side of a guide post erected on a floor, a long-shaped bearing along the back and forth direction which slides in the left and right direction on two guide shafts projecting in parallel with each other from said base plate in a horizontal direction, a thrust shaft which is supported by said bearing and slides in the back and forth direction, a control handle provided at one end of said thrust shaft, and a counter-balancing weight for the total weight loaded on said base plate which is suspended on other side of said guide post;

an automatic chopping mechanism comprising a chopper casing fixed at the other end of said thrust shaft, wedge projections provided on both sides of said casing respectively, a chopper in which the one end is pivoted by said casing, the other end is left free, and along the lower edge provides a blade, a pair of stanchions both projected downward from each side of said casing in order to provide positioning, space retaining and guiding for swingdown operation of said chopper, an automatic driving means which is provided on the top of said casing and which reciprocates the middle part of said chopper in a vertical direction through a link, and an electric circuit provided near said control handle for the control of said reciprocating means.

2. Vertical meat chopper provided with the following mechanisms;

an inductive operating mechanism in X Y Z directions, comprising a base plate which slides in a vertical direction along one side of a guide post erected on a floor, a long-shaped bearing along the back and forth direction which slides in the left and right direction on two guide shafts projecting in parallel with each other from said base plate in a horizontal direction, a thrust shaft which is supported by said bearing and slides in the back and forth direction, a control handle provided at one end of said thrust shaft, and a counter-balancing weight for the total weight loaded on said base plate which is suspended on other side of said guide post;

an automatic chopping mechanism comprising a chopper casing fixed at the other end of said thrust shaft, wedge projections provided on both sides of said casing respectively, a chopper in which the one end is pivoted by said casing, the other end is left free, and along the lower edge provides a blade, a pair of stanchions both projected downward from each side of said casing in order to positioning, space retaining and guiding for swing-down operation of said chopper, an automatic driving means which is provided on the top of said casing and which reciprocates the middle part of said chopper in a vertical direction through a link, and an electric circuit provided near said control handle for the control of said reciprocating means;

a safety device for lowering control of the chopper, comprising a rotatable shaft which is fitted through said base plate and in which a pinion is fixed on one end and a ratchet wheel on the other end, said pinion being engaged with a rack fixed vertically along said guide post, said ratchet wheel being engaged with the ratchet supported by the pin projected from said base plate in such a way that said base plate is left free for lifting but restricted in lowering, and operating means carry out near said control handle engaging and disengaging of said ratchet with or from said ratchet wheel.

3. Vertical meat chopper as claimed in claim 1, wherein said automatic driving means for reciprocating said chopper in vertical direction comprises having the middle part of said chopper pivoted to an air cylinder rod through said link and that a change-over valve for two air press-in ports provided on the cylinder are given repetitive change-over operation by means of twin timer or solenoid.

4. Vertical meat chopper as claimed in claims 1 wherein said automatic driving means for reciprocating said chopper in vertical direction comprises having the middle part of said chopper pivoted to the fore-end of a crank arm through said link and wherein the shaft of said crank arm is driven by motor through speed reduction worm-gears.

5. Vertical meat chopper as claimed in claim 1 wherein said blade has a shape such that the center of the blade is at the lowermost portion thereof and both the forward and the rearward portions adjacent the center are inclined up forming an obtuse angle.

* * * * *